April 25, 1933.  F. GINSBURG  1,905,635
GEAR SHIFTING MECHANISM
Filed April 5, 1932   6 Sheets-Sheet 1

April 25, 1933.  F. GINSBURG  1,905,635

GEAR SHIFTING MECHANISM

Filed April 5, 1932  6 Sheets-Sheet 3

Witnesses:  Inventor:
Fred Ginsburg
By his Attorney:

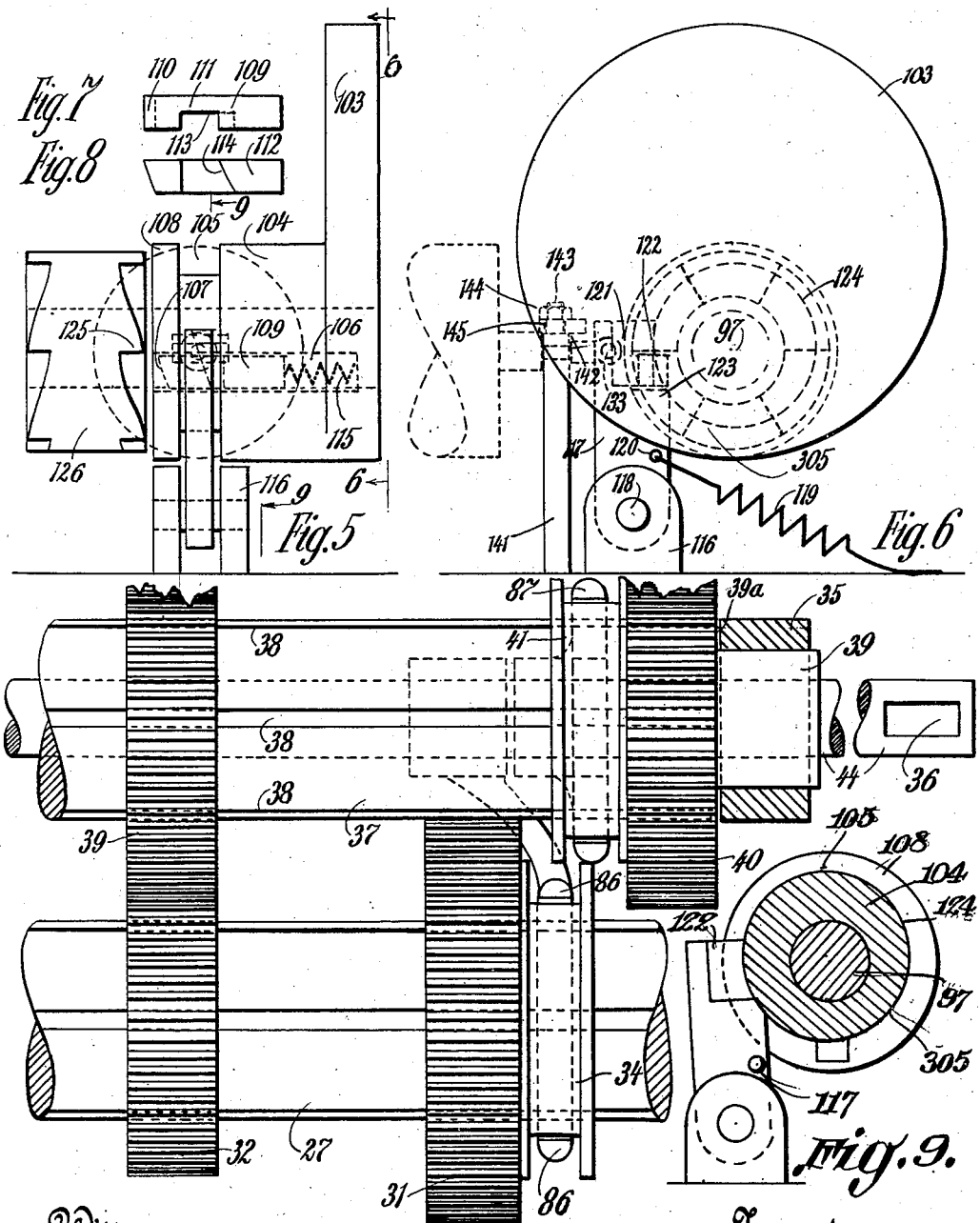

April 25, 1933.   F. GINSBURG   1,905,635
GEAR SHIFTING MECHANISM
Filed April 5, 1932   6 Sheets-Sheet 5
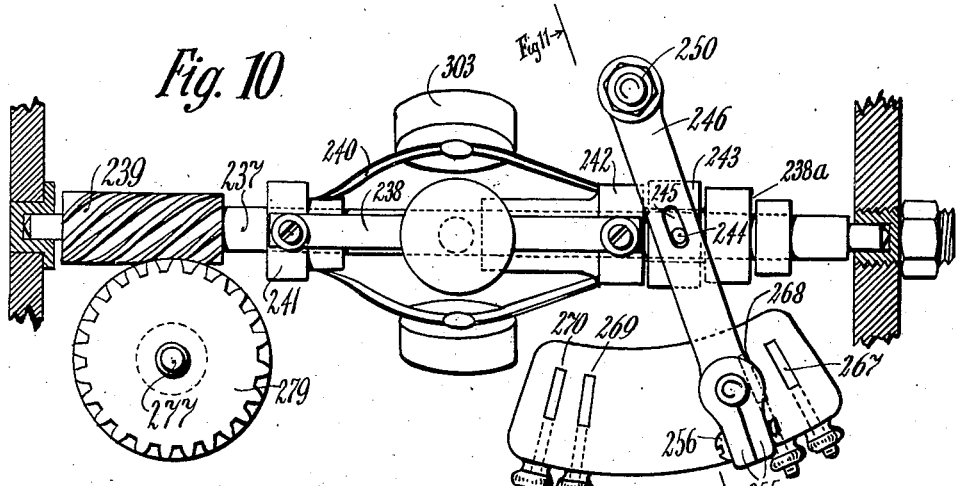
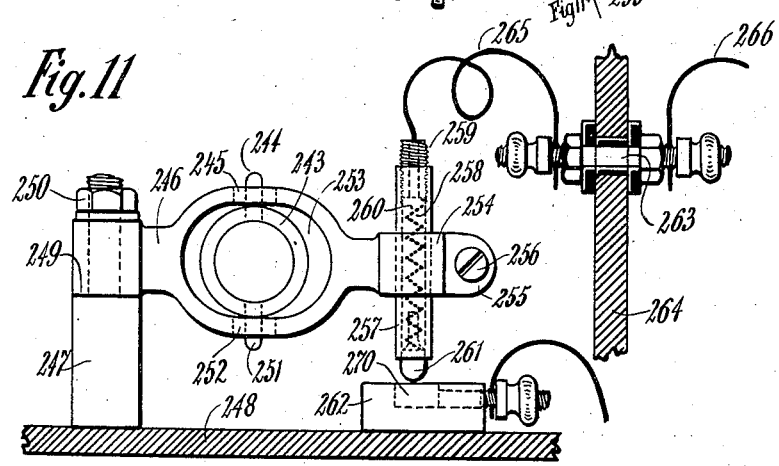
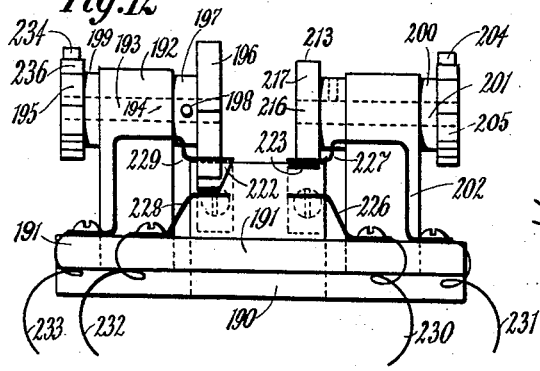
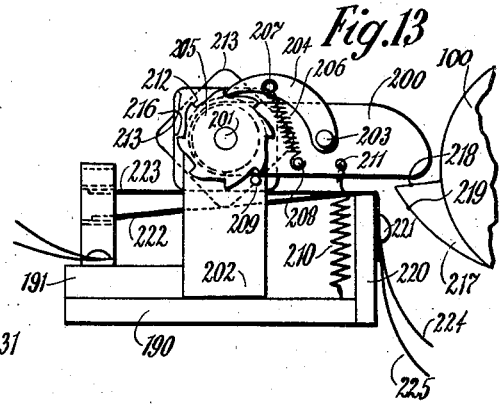

April 25, 1933.  F. GINSBURG  1,905,635
GEAR SHIFTING MECHANISM
Filed April 5, 1932   6 Sheets-Sheet 6

Witnesses:
Inventor:
Fred Ginsburg
By his Attorney:

Patented Apr. 25, 1933

1,905,635

UNITED STATES PATENT OFFICE

FRED GINSBURG, OF CHICAGO, ILLINOIS

GEAR SHIFTING MECHANISM

Application filed April 5, 1932. Serial No. 603,298.

This invention relates to a means for the shifting of driving and driven gears and has to do more particularly with a mechanical arrangement for automatically engaging and disengaging the gears for obtaining different speeds in the propulsion of a motor car.

Those familiar with a motor car, and especially those who have operated one, are well aware of the advantages to be gained through an automatic apparatus for efficaciously shifting speed transmission gears.

In order to shift gears into or out of operative mesh without injury thereto, it is first necessary to eliminate any driving force that otherwise might be transmitted thereto at the time of the shifting of the gears. The contemporary method of making a shift in gears is to release a clutch connecting the driving gears to the motor by means of a foot pedal. This release is anterior to actuation of a hand lever for shifting the gears.

This cumbersome method of manipulating an automobile, but to which the public has become generally accustomed, requires skilled cooperative employment of one hand and both feet, for the accelerator must also be controlled. One foot is used to operate the clutch pedal, the other foot actuates the accelerator, and the one hand (generally the right) controls the gear shift lever. As one hand is engaged to manipulate the gear shift lever, one hand steering is necessary at all times when changing speed.

After a motor car has gotten under way, such gear shifting procedure must be executed twice, e. g., the shift from low to intermediate speed, and the shift from intermediate to high speed, before the car is fully under way.

Similarly, when it becomes necessary to go from a higher speed to a lower speed arrangement, the operation of gear shifting is performed in the identical cumbrous manner.

It is an object of the present invention to provide, for the transmission gears of a motor car, a mechanism adapted to simultaneously release the power from the transmission and rearrange the gears therein.

Another object of the present invention is to provide, for the transmission gears of a motor car, a mechanism for automatically and progressively shifting the gears to correspond with the rate of speed of the car.

Another object of the present invention is to provide for a motor car a gear shifting mechanism adapted to shift the gears into their consecutive arrangements from low to high corresponding to selected speeds of the car, and to make reverse shifts at a slower speed when the car is accelerating negatively than when it is accelerating positively.

Still another object of the present invention is to provide a mechanism for automatically and progressively shifting the speed transmission gears of a motor car and in which a slight manipulation admits of changing the mechanism so that the shifting occurs at a different speed.

Another object of the present invention is to provide a mechanism for automatically and progressively shifting the speed transmission gears of a motor car, the device being coactuated by the motor and the electrical storage unit in said car.

Another object of the present invention is to provide a mechanism for automatically and progressively shifting the speed transmission gears of a motor car which device is controlled by a governor depending upon the speed of the drive shaft of the car for its operation.

Another object of the present invention is to provide, for a motor car, a gear transmission box which is a slight modification from the conventional gear transmission box and which is to be employed in combination with the automatic gear shifting mechanism herein described.

Another object of the present invention is to provide in a gear transmission of a motor car a gear train connecting the driving parts to the driven parts, the gears being constantly in mesh and made operative or inoperative by the coupling and uncoupling of one of said gears from the driven part.

Still another object of the present invention is to provide a means whereby the relative speeds of driving and driven elements in a motor car transmission may be changed in a manner free of noise and without a clashing of gears.

These objects, and other desirable objects to be made apparent in the following description reside in the novel construction, unique arrangement, and improved combination of the elements set forth in the accompanying drawings hereby made a part of this specification and in which:—

Figure 4 is a fragmentary view taken on the line 4—4 of Figure 3;

Figure 5 is a detailed view of an eccentric for disengaging the clutch showing the method of connecting said eccentric to the drive shaft therefor;

Figure 6 is a side view of the eccentric taken on the line 6—6 of Figure 5;

Figure 7 is a top view of a member for operatively engaging the eccentric and drive shaft illustrated in Figures 5 and 6;

Figure 8 is a view of the member shown in Figure 7 taken from the side normally exposed to the front of the mechanism;

Figure 9 is a sectional view taken through the hub of the eccentric shown in Figures 5 and 6 as indicated by the line 9—9 of Figure 5;

Figure 10 is a perspective view of a governor for controlling the device;

Figure 11 is a side view of the control arm of the governor taken at the line 11—11 of Figure 10;

Figure 12 is a perspective view of an instrumentality of the invention for switching the electrical control circuit;

Figure 13 is a side view of the instrumentality shown in Figure 12;

Like reference characters indicate similar parts throughout the description and in the drawings. The latter are to be read conjointly with the description.

Figure 1:
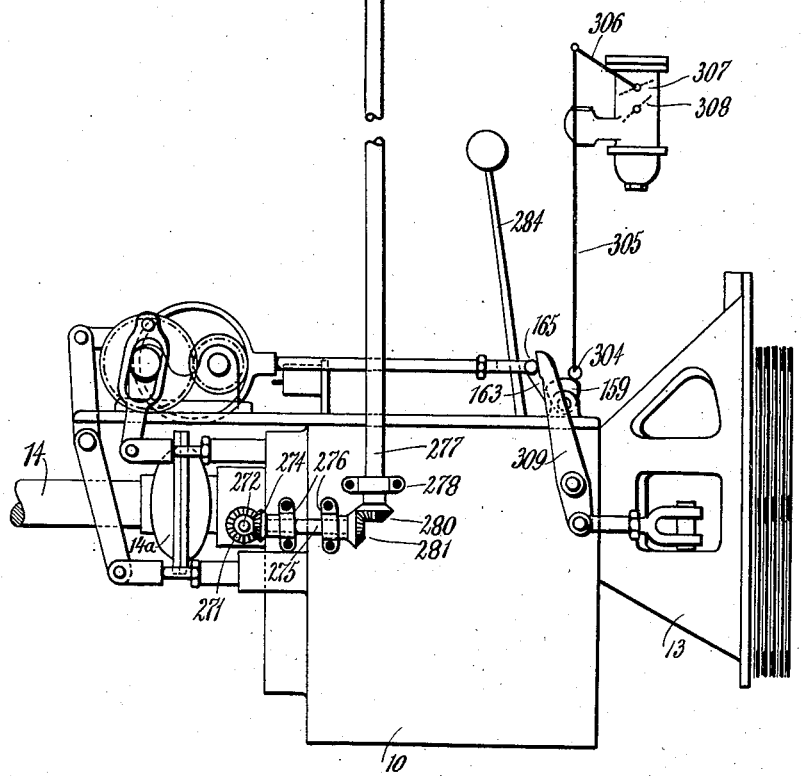
Figure 1 is a side elevation of the invention shown in assembly with a clutch and drive shaft of a motor car.
Figure 2:
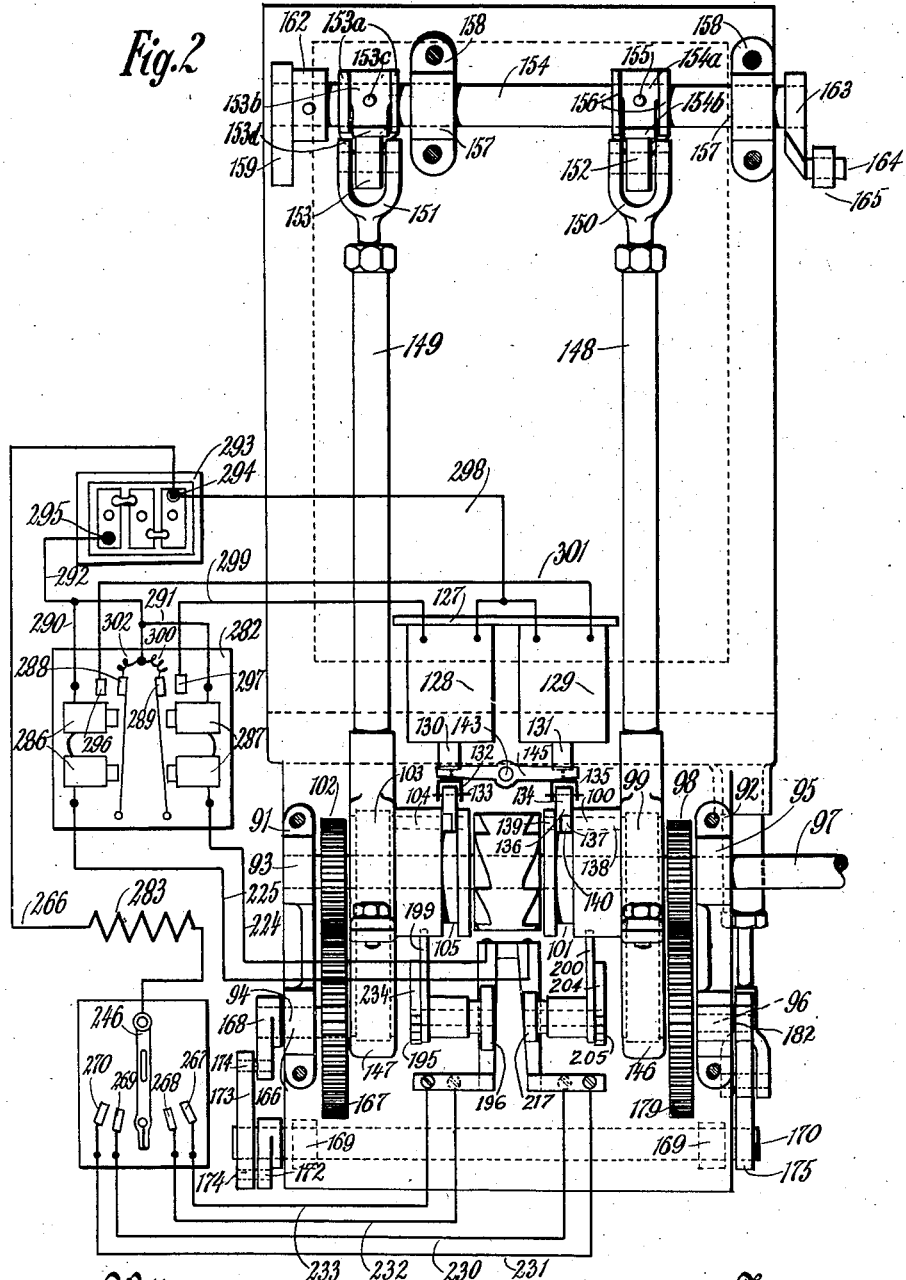
Figure 2 is an orthographic projection of the invention taken from above.
Figure 3:
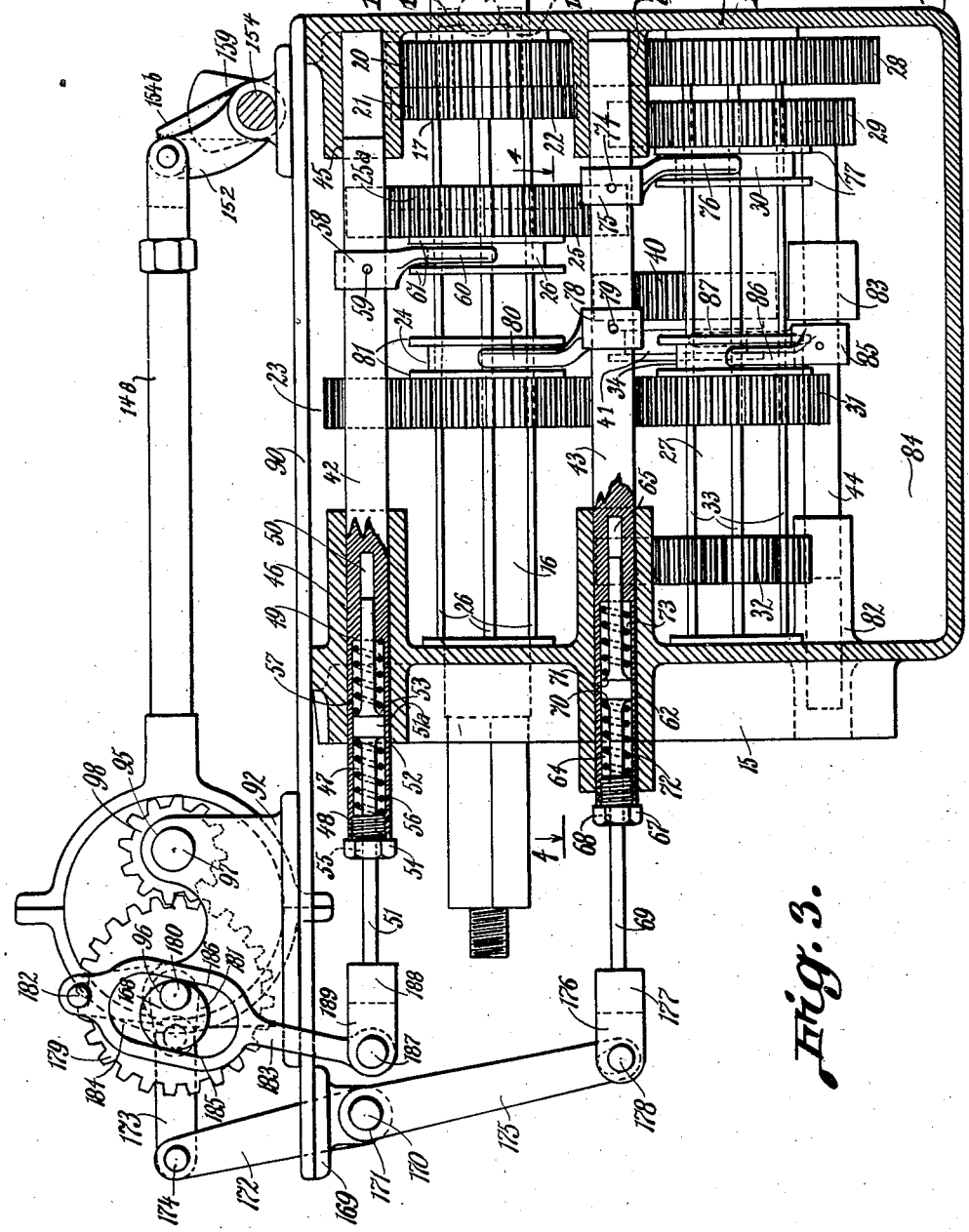
Figure 3 is an enlarged side view of the device taken in elevation and with parts broken away to illustrate details of construction.

Figures 1 and 2 are best explained by the higher numbered figures. Figures 3 and 4 will be considered to engender familiarity with the transmission gearing. The reference character 10 indicates a housing for transmission gears. Suitably journaled in the front wall 11 of the housing 10 is a propeller shaft 12 which leads from the clutch 13, Figure 1. In axial alinement with the shaft 12 is a main shaft 16 disposed for rotation within a suitable bearing provided by the rear wall 15 of the housing 10.

The front end of the main shaft 16 which is splined configures a shoulder at 17 where the diameter of said shaft is decreased, the portion of smaller diameter projecting into a recess 18 in the end of the propeller shaft 12. A ball bearing 19 serves as a thrust member between the shafts 12 and 16, while roller bearings 16a intermediate the walls of the recess 18 and the end of smaller diameter of the shaft 16 provide for ease of rotative movement between the said shafts 12 and 16. The shaft 16 is then adapted to rotate within its bearing support in the rear wall 15 and within the back end of the propeller shaft. To the back end of the shaft 16 which is of polygon cross section is secured the drive shaft 14 by suitable coupling means 14a.

Integral to the propeller shaft 12, to rotate therewith, are gear wheels 20 and 21. The gear 21 is juxtaposed to the gear 20 and is of smaller diameter. If desired, the gears 20 and 21 may be keyed to the shaft 12 instead of being intricate thereto.

Slidably mounted upon the shaft 16 is a gear 23 with a flanged collar 24 attached to the side of it. To the front of the gear 23 is a second gear 25, also slidably mounted upon the shaft 16. A flanged collar 26 is fixed to the rear face of the gear 25. Both gears 23 and 25 are feathered to the shaft 16 by means of splines 26.

A concavity is countersunk in the front face of the gear 25 and bears upon its circular wall a train 25a of internal grooves not unlike gear teeth for engaging the gear 21 by being slid thereover.

Below and to the right of the shaft 16 is a countershaft 27 journaled at its respective ends in the front and back walls of the housing. Keyed to the shaft 27 at its extreme front end is a gear 28 which is in mesh with the gear 20 at all times and is for driving the countershaft. In juxtaposition to the gear 28 and upon the shaft 27 to slide longitudinally thereof is a gear 29. Gear 29 has secured to its rearmost face a flanged collar 30. Rearwardly of the gear 29 and for rotating with the shaft 27 are gears 31 and 32. The gear 32 is fixedly attached to the shaft in any standard manner while the gear 31 is free to slide axially of the shaft as guided by the splines 33. Extending from the forward face of the gear 31 is a flanged collar 34 by means of which the gear is moved along the shaft.

For reasons of uniformity and convenience, the terms "right" and "left" will be had with reference to the device as viewed in Figure 2, The front of the device is indicated by the word "front", Figure 3, and is the side at which the propeller shaft engages the device. The drive shaft 14 enjoins the device at the back side.

Suitably journaled with an end in the back wall of the housing and with the opposite end in a bracket 35 projecting from the left side of the housing is a third splined shaft 37 with splines 38 in parallelism to the major dimension of said shaft. The front end of the shaft 37 is turned down to provide a bearing portion 39 and a shoulder 39a, the latter being for coacting with the bracket 35 to prevent end play of said shaft. Longitudinal movement of the shaft 37 in the opposite direction is provided by a shoulder (not shown) similar to the shoulder 39a and for thrusting against the housing wall 15.

Attached to the shaft 37 in a stationary manner, to rotate therewith, and for meshing with the gear 32 is a gear 39. By means of the gears 32 and 39, the shaft 37 is made to rotate continuously during the time the clutch 13 is engaged, and the motor, not shown, is in motion. Forwardly of the gear 39 is a gear 40 slidable on the shaft 37 and rotatable with said shaft by engagement with the splines 38. A flanged collar 41 is secured to the rearmost face of the gear 40.

Reciprocally mounted within the housing 10 are gear shifting rods 42, 43 and 44. Bearings 45 and 46 in the front and back walls of the housing respectively provide a support for a reciprocating member 42. The back end of the shifting rod 42 contains a recess 47 internally threaded at 48. The bottom 49 of the recess 47 is countersunk to provide a complemental recess 50.

A stem 51 is mounted in the recessed end of the rod 42. An enlarged portion 51a of the stem 51 presenting shoulders 52 and 53 is of a cross section congruitous to that of the recess 47 and is free to slide back and forth therein. The threads 48 adapt a plug 54 having a central bearing 55 to be attached to the end of the rod 42. Aligned position of the stem 51 is maintained by the bearing 55 and the recess 50. Compression springs 56 and 57 on either side of the shouldered portion 51a of the stem 51 urge said portion toward a central position in the recess 47 and normally maintain it in that position.

For engaging the flanged collar 26 is a bifurcated bracket or fork 58 fixedly placed upon the shaft 42 by means of a set screw 59. Members 60 of the bracket 58 do not frictionally engage the guiding members 26 to impede its rotation, but do press against one of the flanges 61 when moved axially of the gear 25, depending upon the direction of movement of the shift rod 42, to propel the gear in a like direction.

Shift rod 43 is mounted in the identical manner as is the rod 42. Bearings 62 and 63 suspend the rod in a manner to permit of its being reciprocated forwardly and backwardly. Recesses 64 and 65 corresponding to recesses 47 and 50 respectively in the above described shift rod are formed in the back end thereof. A cap 67 with a bearing 68 is accommodated by the back end of the rod in co-support with the smaller recess 65 of a stem 69. Shoulders 70 and 71 upon the stem 69 are urged in opposite directions by compression springs 72 and 73 confined within the recess 64.

The forward part of the member 43 has secured thereto, in fixed relation by means of a set screw 74, a fork 75. Prongs 76 comprising an integral part of the fork 75 engage the flanges 77 of the guide race 30 for the movement of the gear 29 along the shaft 27.

A second bifurcated member 78 is rigidly attached to the rod 43 by standard means 79 and is for manipulation of the gear 23. Gears 23 and 29 are moved simultaneously and in accordance with movement of the rod 43.

Shaft, or shift rod, 44 is supported near the bottom of the housing by bearing 82 in the rear housing wall, and a second bearing 83 depending inwardly from the left housing wall 84. A compound bracket 85 is immovably secured by any standard means to the rod 44, the latter being longitudinally reciprocable in the bearing supports 82 and 83. Fingers 86 and 87 diverge from the bracket 85 to engage, respectively, the flanged collars 34 and 41 of the gears 31 and 40.

Operation of the shift rod 44 is had by means of a hand lever 284 which engages said rod 44 by means of the slot 36 and for synchronously sliding the gears 31 and 40 as an incident to the mutual connection of the bracket 85 to said gears. The hand lever is used for shifting the gears from a neutral position to reverse and back to neutral again as will be subsequently described in a disclosure of the operation of the device.

Attention is now directed to the top of the housing 10 which top is formed by a heavy plate 90. The back portion of the plate 90 projects to the rear of the housing and serves to support certain of the apparatus parts there. At the left and right sides of the rearwardly projecting portion of the plate 10, respectively, are standards 91 and 92, Figures 2 and 3. Within the standard 91 are bearings 93 and 94. Similarly, in standard 92 and aligned with the bearings 93 and 94, are bearings 95 and 96.

Rotatively supported within the bearings 93 and 95 is a shaft 97. The shaft 97 is in operative connection with the motor of the car as a prime mover. Adjacent the inner side of standard 92 and upon the shaft 97 is a small spur gear 98. Inwardly of the gear 98 and upon the shaft 97 is an eccentric 99 provided with an offset hub 100 to project further inwardly. The gear 98 is attached to the right face of the eccentric in a manner to rotate therewith and the shaft 97 is free to turn within said gear and said eccentric. Near the inner peripheral edge of the hub 100 is a groove 101, circumscribing the hub.

To the right of the standard 91 and freely journaled upon the rotating shaft 97 is a second spur gear 102 of equal diameter with that of the gear 98. Fabricated to the right face of the gear 102 is an eccentric 103 with an offset hub 104 projecting to the right thereof. Within the periphery of the hub 104 near its extended edge is a groove 105 which completely encircles the hub.

By reference conjointly to Figures 5 and 6, a more detailed conception of the hub and eccentric 103 and 104 is had. In the side of the hub 104 which is normally to the front of the device is a slot 106 of rectangular cross section. The innermost face of the slot is of a radius from the shaft 97 equal to that of the bottom of the groove 105. In direct alinement with the slot 106 is an aperture 107 transgressing a flange-like section 108 formed in the hub 104 as caused by the groove 105. The cross section of the aperture 107 is identical to the cross section of the slot 106.

Reciprocally contained within the slot 106 and the aperture 107 is a dog 109. Two views of this dog are found in Figures 7 and 8, Figure 7 being a top view and Figure 8 a front view. A face 110 forming the right end of the member 109 is angular to the top face 111 to extend downwardly and to the left therefrom. Within the front side 112 of the dog is a notch 113 providing a camming side 114 substantially parallel to the face 110. To the left of the member 109 is a compression spring 115 for constantly urging the slotted member to the right.

Suitably anchored to the plate 90 slightly forward of the shaft 97 is a bracket 116. Hingedly attached to the bracket 116 is a trigger 117, the attachment of the trigger being had by means of a pin 118. For constantly urging the trigger 117 to pivot to the rear about the pin 118 is a spring 119 having an end secured to a small aperture 120 in the trigger and the opposite end anchored in any standard manner to the plate 90.

Configuring the uppermost end of the trigger 117 is a wedgelike section 121 presenting a camming face 122 to the left side of the trigger and convergent upon the right side of the trigger as it extends upwardly. A bearing surface is provided upon the trigger 117 at a point 123 upon its back side. It will be noted that the bottom of the groove 105 is not truly circular but of progressively varying radii as indicated in Figures 6 and 9, where the bottom of the groove is designated by the reference numeral 124. The reason for the contour of this groove will be made evident later in the description.

The notch 113 in the dog 109 receives the back edge of the wedge shaped end of the trigger 117 in a manner to prevent said dog from being urged to the right by the effort of the spring 115, and into operative engagement with the cogs 125 of a cog wheel 126. A central position upon the shaft 97 is taken by the cog wheel which is fixedly attached thereto.

Secured to the plate 90 forwardly of the shaft 97 in an immovable manner is a bracket 127 having in turn mounted thereon electromagnet coils 128 and 129. Complemental to the coils 128 and 129 are plungers 130 and 131 respectively. Connection is had between the plunger 130 and the upper end of the trigger 117 by means of a clevis member 132. A pin 133 of the clevis is passed through a suitable hole in the top of the trigger.

The hub and trigger construction to the right of the cog wheel 126 is exactly like that just described and to the left of said cog wheel. In Figure 2 is a trigger 134 connected to the plunger 131 by means of a clevis 135. Trigger 134 is pivotally connected to a bracket similar to bracket 116. A wedge-like configuration 136 is taken by the upper right and back side of the trigger 134 with an inclined face 137 extending upwardly and angularly to the left. A slot 138 is provided in the hub 100 as well as an aperture 139 aligned therewith for the accommodation of a dog 140. For urging the dog 140 to the left is a spring (not shown), but at the right end of the slot 138 in the exact manner as is the spring 115 arranged at the left end of the opposed slot 106. The bottom of the entrenchment 101 is congruent and in axial registry with the bottom of the entrenchment 105.

Midway the electromagnetic coils 128 and 129 and slightly to the rear thereof is anchored an upright post 141. The upper end of the post 141 is provided with a shoulder 142 and a centrally disposed spindle 143, the latter being threaded at its upper extremity to receive a nut 144. The shoulder 142 is at a height to suitably space a safety lever 145 with reference to the triggers 117 and 134. Rotation of the safety lever 145 is freely had about the spindle 143. Normally, however, the lever 145 is in the position illustrated in Figure 2. The ends of the said lever 145 project slightly beyond the position of the triggers 117 and 134.

Both of the eccentrics 99 and 103 are mounted upon the shaft 97 in a manner to allow said shaft 97 to rotate freely therein. Eccentric followers 146 and 147 are respectively upon the eccentrics 99 and 103. Connecting rods 148 and 149 having divided ends 150 and 151, respectively, connect the eccentric followers to the shanks of yokes 152 and 153 which are rotatively attached to a shaft 154 at the front of the housing 10. The divided members 156 and 153a of the yokes 152 and 153, are apertured for receiving the shaft 154.

Held fast to the shaft 154 by standard means 153c and 155 are shanks 153b and 154a of lugs 153d and 154b. Lugs 153d and 154b project upwardly in direct front position of the shanks of yokes 153 and 152. This arrangement provides that either of the connecting rods 148 or 149 may be thrust forwardly independently of the other for rotating the shaft 154 through the agency of the said lugs.

Journals 157 for the shaft 154 are provided in brackets 158 secured to the front of the housing plate 90. Attached, in a non-rotative manner, to the left end of the shaft 154 is a cam plate 159. A hub 162 integral to the right face of the cam plate 159 is coapertured with said plate for receiving the shaft 154.

Depending from the opposite end of the shaft 154 is an arm 163 adapted to rotate only with the shaft. A wrist pin 164 projects outwardly from the extended end of the arm 163 and has a roller bearing 165 journaled thereon.

Attention is again directed to the back of the device and especially to the bearing 94 in the bracket 91 in which is journaled a short shaft 166. Upon the right end of the shaft 166 is feathered a gear wheel 167 for meshing with the gear 102, the gear 167 being twice the diameter of the gear 102. The left end of the shaft 166, contiguously to the standard 91, bears a short arm 168 in fixed relation to said shaft. From the underside of the rearwardly projecting end of the plate 90 project brackets 169 having bearings 171. A shaft 170 is oscillatively contained within the bearings 171. Attached to the left end of the shaft 170 is an arm 172 directly to the rear of the arm 168. A pivotal connection between a link 173 and arms 168 and 172 is had by means of pins 174.

To the opposite end of the shaft 170, in a manner to rotate therewith, is secured a lengthy arm 175. The extended end of arm 175 is contained between the bifurcations 176 of a head 177 comprising the end of stem 69. An elbow joint is formed between the arm 175 and the head 177 by virtue of the pin 178.

Figure 3 discloses a spur gear 179 connected to a shaft 180 journaled within the bearing 96 of the standard 92. The gear 179 is of the same diameter as the gear 167 and is twice the diameter of the gear 98 with which it is meshed. The opposite end of the short shaft 180 eccentrically carries thereon a circular member 181. Projecting above the bearing 96 is a protuberance of the standard 92 from which projects a pin 182, the latter extending to the right from the standard and serving as a pivotal anchorage for the rocker arm 183. The upper portion of the rocker arm 183 is enlarged and within the enlargement is an oblong aperture 184 having sides 185 and 186 for coinciding with the eccentric member 181. By means of a pin 187 there is a pivotal connection of the lower and extended terminus of the rocker arm 183 to a head 188 borne by the stem 51. The head 188 is yoke-like to accommodate the lower end of the rocker arm between its confluent members 189.

Immediately to the rear of the shaft 97 and secured to the housing's upper plate 90 is a symmetrically constructed device for deviating the electrical control circuit from the governor. A detailed view of this device comprises a base 190 for connection to the plate 90 upon which it is mounted. A terminal block 191 of any dielectric material is mounted upon the base. Rising from the left side of the base 190 is a standard 192 with a bearing 193 serving as a journal for a short shaft 194. The left end of the shaft 194 bears, in a manner non-rotative thereto, a ratchet 195. The opposite and right end of the shaft 194 carries a block 196 having a generally rectangular periphery. Attachment between the block 196 and the shaft 194 is had by means of a short collar 197 intricate to the block 196 whereby a set screw 198 may be engaged to the shaft.

Intermediate the ratchet wheel 195 and the bracket 192 and upon the shaft 194 is pivoted one end of a lever arm 199. This arm 199 is identical to an arm 200 pivotally secured to a shaft 201 journaled in a standard 202 at the right side of the base 190. Lever 200 is seen in side elevation in Figure 13. Upon the right side of the lever 200 and at an end a pawl 204 is pivotally anchored by means of a pin 203. The extended end of the pawl 204 is held in impinging contact with the serrated periphery of a ratchet wheel 205 by means of a spring 206 attached between the pins 207 and 208 upon the pawl 204 and the lever 200 respectively.

Projecting from near the front edge of the standard 202 and to the right thereof is a short boss 209. This boss is within the path of the lever 200 and is to preclude movement of said lever beyond the horizontal position as it is urged downwardly by a spring 210. Spring 210 has one end anchored to the base 190 and the other to an aperture 211 in the lever arm.

It will be noted that the ratchet 205 has eight cogs 212 distributed evenly about its periphery. It will be further noted that the said cogs 212 are in direct axial alinement relative to the shaft 201 to either a corner 213 or a flat face 216 of the block 217 carried upon the left end of the shaft.

Projecting rearwardly from the hub 100 is a lug 217 for presenting a face 218 to the extended end of the lever 200. Rotation of the hub 100 is had in a clockwise manner as viewed from the right side of the mechanism so that when the lever 200 is struck by the face 218, said lever will be elevated, or moved about its axis within the shaft 201 sufficiently to rotate the ratchet-wheel one-eighth of a revolution. Subsequent to the movement of the ratchet wheel, the boss 217 passes beyond the end of the lever 200 to allow the extended end of said lever to return to its normally horizontal position from the urge of the spring 210, the end of the lever being allowed to return to position by gently sliding along the edge 219 of the boss 217.

The back edge of the base 190 carries an insulating block 220 having anchored thereto, by means of screws 221 or other suitable means, spring contactors 222 and 223. Leading from the anchored ends of the spring contactors are leads 224 and 225. Placed upon the block 191 are contacts, spring-like in nature, designated by the numerals 226, 227, 228 and 229. Said contacts are held in place by screws or binding posts in the dielectric block 191 where they are joined to conductors 230, 231, 232 and 233.

For operating the ratchet 195 is a pawl 234 which is in turn operated by the lever 199 in the same manner as is the pawl 204 by lever 200. There are eight cogs 236 upon the ratchet 195, these being evenly spaced upon its periphery. The hub 104 carries upon its periphery a lug, not shown, but an exact replica of the lug 217 upon the offset hub 100, said lug being for actuating the lever 199.

When the shaft 201 is moved to in turn rotate the square block 217, the corners of the block being of a greater distance from the axis of the shaft, will displace the spring contactor 223 to bring it against the contact 226. A continued rotation of forty-five degrees of the shaft 201, and of the block 217, or the amount of rotation imparted thereto by a single operation of the lever 200, will present a flat face 216 of the block to the contactor 223 and thus allow the said contactor under its own effort to be brought upwardly in firm connection with the contact 227. In a like manner, the spring contactor 222 is manipulated by the ratchet 195 and pawl 234 in combination with the block 196 to alternately make and break contact with the contactors 228 and 229.

An ordinary fly ball governor 237 or similar device is employed in the device for connecting and disconnecting the electromotive force thereto. The governor consists of a spindle 238 having each end suitably journaled and possessing a helical gear 239 fixedly attached thereto. Flexible links 240 of the governor are held stationary relative to the shaft 238 at one end by means of a collar 241. The other end of the members 240 are attached to a slider member 242, the latter being movable upon the spindle 238. Mounted within a groove 238a of the slider member 242 is a sleeve 243 which allows free rotative movement of said member therein.

A short pin 244 projects upwardly from the body of the sleeve 243 and into an oblong aperture 245 contained within an arm 246. The arm 246 is transverse to the shaft 238 and is pivoted at one end to a post 247 anchored to the base 248 of the governor, and in a manner to swing in a plane containing the axis of the shaft 238. A shoulder 249 upon the post 247 measurably spaces the arm 246 from the base and a nut 250 may be screwed upon the top of the post to prevent displacement of the arm.

Depending downwardly from the sleeve 243 is a pin 251 in axial alinement with the pin 244. An aperture 252, oblong in shape, in the lower part of the arm 246 confines the pin 251. An enlarged central portion of the arm 246 contains an aperture 253 in which the sleeve 243 is free to pivot about its trunnion-like pins 244 and 251. The extended end of the arm 246 configures a split collar 254. Opposed ears 255 as part of the collar 254 are drilled and one of them may be threaded to accommodate a screw 256 for the purpose of drawing the two ears together.

In this manner a stem 257 which is traversed throughout its major dimension by a channel 258 threaded at its upper end is held in position. A plug 259, having a spring 260 attached thereto, is screwed into the internally threaded end of the stem. To the opposite end of the spring 260 is attached an electrode 261 which is forced downwardly by the urge of said spring 260 to be limited in its downward movement by contact with the top of a block 262 of a dielectric material. The stem 257 is of an insulating material so that there will be no electrical connection between the arm 246 and the electrode 261.

An electrical circuit is completed from the plug 259 to a bushing 263 suitably contained within a side wall 264 of the governor housing by means of a conductor 265. A conductor 266 may be used for leading the electric circuit from the other end of the bushing. Countersunk in the upper face of the block 262, which is laid upon the base 248, are commutator bars 267, 268, 269 and 270, all being flush with said upper face of block 262. The arcuate arrangement of the bars causes them to fall within the path traversed by the electrode 261 as the arm 246 is pivoted about its anchorage in the post 247.

Reference to Figure 1 discloses a beveled pinion 271 upon a shaft 272, making operative connection by means of a second beveled pinion, not shown, to the main shaft 16. The pinion 271 engages the pinion 274 upon the end of a shaft 275 normal to the shaft 272 and journaled in bearing blocks 276. The housing 10 for the transmission gears serves as the mounting for the blocks 276. A second shaft 277, having one end journaled in a bearing block 278, engages the helical gear 279 upon the extended end of said shaft. Rotation of the shaft 277 is had by means of a beveled gear 280 which meshes with a similar gear 281 upon the shaft 275.

It is thus made apparent that the motive power for the governor 237 is supplied from the driving part of the transmission. In a motor car, this shaft 272 is connected directly to the running gear, hence the governor 237 operates in direct conjunction with the vehicular speed of the car.

Because it is not desired to connect heavy conductor cables to the governor and the electrical contacts in association therewith, a relay is used in connection with the governor and is shown schematically in Figure 2, and is designated by the numeral 282. Within the relay circuit is a resistance unit 283, it being in the present case in the leg 266 leading from the electrical source to the electrode 261 in the arm 246.

The commutator segments 267, 268, 269 and 270 on the governor are connected, respectively, to the conductors 233, 232, 230 and 231. Leading from the spring contactors 222 and 223 of the relay circuit deviating device are the conductors 224 and 225. The relay 282 comprises electromagnetic coils 286 and 287. These coils are for magnetically attracting and moving the contacts 288 and 289 respectively. Connection to the coil 286 is had by the conductor 225 and to the coil 287 by the conductor 224.

The opposite sides of the coils 286 and 287 are respectively connected, by legs 290 and 291, to a leg 292, hence, to the opposite side of the electric source 295 as is the leg 266. Thus an electric circuit from the terminal 294 of the electric source is completed through leg 266, the resistance 283, the electrode 261, any of the various commutating bars in the insulator block 262, through the respective conductors to the circuit deviating device, through the spring contactors 222 or 223 in said device, and through the electromagnetic coils 286 or 287 in the relay by means of the branches 224 or 225, through the respective legs 291 or 290, and 292 and thence to the terminal 295 of the source of power. Through the circuit just described the resistance unit 283 permits only a limited amount of current to flow.

The contacts 288 and 289 in the relay 282 are for carrying a greater amount of current than the circuit just described. Complemental to the said contacts 288 and 289 are contacts 296 and 297. When the contacts 289 and 297 are closed, an electric circuit is completed from the terminal 294 of the source of power through the leg 298, the electromagnetic coil 128, the leg 299, the said named contacts, a flexible conductor 300, and the leg 292 to the opposite terminal 295 of the electric source.

By closing the contacts 288 and 296 by energizing the electromagnetic coils 286, an electric circuit is completed between the terminals 294 and 295 by way of the leg 298, the coil 129, the leg 301, the said named contacts, a flexible conductor 302, and the leg 292. Consequently, when the contacts 289 and 297 are closed, the electromagnetic coil 128 will be energized for actuating the plunger 130, and when the contacts 288 and 296 are closed, the circuit from the electric source is thereby completed to energize the electromagnetic coil 129 to actuate the plunger 131.

The present device is not intended to shift the transmission gears automatically from the neutral position to reverse, or vice versa. Neither is the device to automatically shift the gears from a neutral position to low, or the first gear, or in the reverse order. The four operations just enumerated are accomplished by moving the shift rod 44 by a hand lever 284, not unlike the conventional hand lever.

After the motor of the car has been started, it is necessary to bring the car into the control of the present device by first depressing the clutch by means of a foot pedal and subsequently operating the shaft 44 forwardly by hand to bring the gear 31 to the position shown in Figure 3. This is the position where the gear 31 will be engaged with the gear 23. Power is delivered from the motor (not shown) to the gear 20 by means of propeller shaft 12 to drive the gear 28 which is in mesh with the gear 20 at all times. Thus the splined counter shaft 27 is caused to rotate at all times that the motor is running and when the clutch 13 is engaged to the shaft 12. The splined shaft 16, since it is free to rotate as journaled upon the backmost end of the propeller shaft independently of the gear 20, or 21, is thus driven at a speed different to that of the gears 20 or 21, and slower.

With the car in motion, or with the drive shaft 16 in motion, the governor is thereby operated by the various shaft linkages therebetween and the said drive shaft. As the speed of the drive shaft and the main shaft 16 is increased, the rate of rotation of the governor spindle 238 and the fly balls 303 thereon is increased causing the fly balls 303 to spread apart and thus draw the slider member 242 to the left in Figure 10.

Before the governor shaft is caused to turn, the arm 246 is in a position to the right of the commutator bar 267. As the speed of the car increases, the governor shaft 238 causes the arm 246 to be moved to the left whereby connection is made between the electrode 261 and the bar 267.

The leg 233 leading from the commutator bar 267 leads to the contact 229 on the circuit deviating device and when the car had previously been brought to a stop the square block 196 had been left in a position to depress the spring contactor 222 away from the contact 229 leaving the electric circuit open. Hence there is no reaction of the apparatus by the contact of the electrode 261 and the bar 267.

When a greater speed is acquired by the governor, the arm 246 is advanced to the left to bring the electrode into contact with the commutator bar 268 to close the electric circuit from the battery terminal 294 through the leg 266, the leg 232, the contact 228, contactor 222, leg 224, electromagnetic coils 287, leg 291, and leg 292 to the opposite terminal 295 of the battery.

Figures 5 and 6 illustrate how the trigger 117 is pulled forwardly by the forward movement of the plunger 130 and against the urge of the spring 119. It will be recalled that the shaft 97, while the motor of the car is in motion as a prime mover therefor is caused to rotate in a clockwise direction when observed from the right side of the device in Figure 3. Releasing the trigger 117 from the dog 109 by this forward movement allows the dog to be propelled to the right through the aperture 107 and into engagement with one of the cogs 125 upon the cog wheel 126. Engagement is then had between the cog wheel 126 and the eccentric 103 to cause the eccentric to rotate in the clockwise manner therewith.

While the car has been driven forward in the low gear, the clutch has necessarily been engaged and when so engaged the point of eccentricity of the eccentric 103 is to the back side of the shaft 97. A clockwise movement of the shaft 97 then brings the point of eccentricity after a rotation of one hundred eighty degrees to the front side of the shaft, and consequently displaces the connecting rod 149 forwardly. Concurrent with the forward movement of the shaft 149 the camming plate 159 is brought under a roller 304 for thrusting a rod 305 upwardly, as noted in Figure 1. The opposite end of the rod 305 is connected in any manner, as by pivoted lever 306, to a butterfly valve 307 in the carburetor 308 of the motor. In this manner the fuel supply to the motor is cut off. Also, as the shaft 154 is being rotated clockwise for shutting off the fuel supply, the arm 163 is rotated to press the roller 165 against an auxiliary clutch lever 309 for disengaging the clutch 13.

The gear 102 being moved in a clockwise direction with the eccentric 103, rotates the gear 167 in an anticlockwise direction whereby the shaft 170 is caused to rotate in a clockwise direction through the agency of the linkage coformed by the arms 168 and 172 and the link 173. Therefore, the arm 175 is caused to draw the shifting rod 43 backwardly in a manner to displace the gear 23 to the rear and out of alinement with the gear 31. Simultaneously the gear 29 is displaced to the same amount and in the same direction by means of the prongs 76 and for engagement with the gear 25. As soon as the gear 23 is clear of the gear 31, the gear 29 begins to mesh with gear 25, and when the gear 167 has turned through one hundred eighty degrees the shifting rod 43 has been moved to its rearmost position to bring the gear 29 into complete mesh with the gear 25.

Gears 29 and 25 are nearer the same diameter than are gears 31 and 23 hence the new arrangement sets the car in second speed.

As the eccentric 103 and the hub 104 were rotated with the shaft 97 a lug (not shown) upon the hub 104, but similar to the lug 217 upon the hub 100, was brought in engagement with the lever 199 to operate the pawl 234 and the ratchet 195 for turning the rectangular block 196 to present a flat face of said block to the spring contactor 222 thus allowing said contactor to spring upwardly, breaking the electric circuit through the governor. In this manner, the electric circuit is broken whereby the plunger 130 is released from the electromagnet 128 and the trigger 117 is pulled backwardly with its camming edge 123 to press against the bottom of the groove 105 under the urge of the spring 119. As the shaft 97 then nearly completes its revolution, the wedge-like end 122 of the trigger 117 engages with the camming surface 114 of the dog 109 to force the dog to the left and out of engagement with the cog wheel 126. The eccentric 103 and the gear 102 are then precluded from making more than a single complete revolution.

Since the gear 167 is twice the diameter of the gear 102, only one half of a revolution of said gear 167 occurred during the entire revolution of the gear 102. Hence the pin 174 is transferred from a backward position, as shown in Figures 2 and 3, to a forward position relative shaft 168, and the extended end of the lever arm 172 is displaced to its most forward position to displace the extended end of the lever 175 and the shifting rod 43 to their most backward positions.

With the gears thus positioned in the second gear arrangement, the eccentric has completed its revolution. In completing the second half of its revolution the eccentric withdraws the connecting rod 149, thus allowing the shaft 154 to be rotated in an anti-clockwise direction, as viewed from the right side in Figure 3, under the influence of a spring within the clutch 13 acting upon a linkage to the arm 309 and hence imparting rotative movement to said shaft 154 through the agency of the arm 163. It will be noted at this time that as the shaft 154 was rotated in the clockwise direction by the thrust of the connecting rod 149 against the lug 153d that the connecting rod 148 remained stationary and that the lug 154b was rotated away from the end of the rod 148. The retrogressive movement of the shaft under the impetus of the clutch spring then in addition to holding the lug 153d in its seated position against the shank of the yoke 153 during the retracting movement of the connecting rod 149 also returns the lug 154b to its seated position against the shank of the yoke 152 at the end of the connecting rod 148. When the shaft 154 is returned to the position shown in Figure 2 by turning in an anti-clockwise direction, the cam plate 159 is moved from beneath the roller 304 so that the fuel supply may again be available to the motor. The clutch 13 also is then reengaged so that the shaft 16 is again connected to the motor. After this cycle, the car may again be accelerated.

Pursuant to further acceleration of the car and hence the faster turning of the drive shaft 14, the governor spindle 238 is accelerated to draw the arm 246 clockwise, to bring the electrode 261 into contact with the commutator bar 269.

It will be noted in Figure 12 that the spring contact arm 223 is in an upward position and that a contact with the commutator bar 269 will not be effective for the leg 230 is dead at the contact 226. However, continued acceleration of the drive shaft 14 results in the arival of the electrode 261 into contact with the commutator bar 270, whereby an electric circuit is completed between the terminal 294 of the electric source, the leg 266, the leg 231, through the contact 227, spring contactor 223 of the circuit deviating device, through the leg 225, the relay magnets 286, and the intervening legs to terminal 295.

With the electromagnets 286 thus energized, contact points 288 and 296 are brought together to close the electric circuit through the electromagnet 129, whereby the trigger 134 is displaced to allow the eccentric 99 to become engaged to the cog wheel 126 in the identical manner as was the eccentric 103, previously described.

The eccentric 99 is then rotated in a clockwise direction to thrust the connecting rod 148 forwardly to shut off the fuel supply of the carburetor and to release the clutch. Concurrently, the gear 179 is rotated in an anti-clockwise direction to rotate the disc 181 mutually and eccentrically upon the shaft 180 therewith in a like direction. The gear 179, being of twice the diameter of the gear 98, the former gear is rotated but one hundred eighty degrees for a complete revolution of the last named gear.

More than a single revolution of the eccentric 99 is prevented by the trigger 134 which upon being released incident to the governor electric circuit being broken by the turning of the block 217 to displace the spring contactor 223 from the contactor 227 in a manner later to be more fully described, is replaced by a spring (not shown, but similar to spring 119) to the bottom of the groove 101 to present the wedge-like configuration 136 to a camming surface in a dog. This dog is not unlike the dog 109 and has a camming surface similar to surface 114 of that member for engaging with the trigger 134 to displace the dog from operative connection between the cog wheel 126 and the hub 100.

The turning of the shaft 180 one half of a revolution presents the point of eccentricity of the disc 181 to the forward side of that shaft, and thus rocks the arm 183 to a forward position. Consequently, the shifter rod 42 is moved to its forward position to disengage the gear 25 from the gear 29, and immediately following the disengagement, to engage the internal gear, 25a, with the gear 21. This engagement places the main shaft 16 in direct connection with the driving shaft 12.

In order that there will be no disastrous clashing of gears, a semi-positive means for engaging and disengaging the gears is provided by a compression spring arrangement in the backmost end of the shifting rods 42 and 43. Since the two rods are the same, description of the construction in the rod 42 is thought sufficient. Here it will be noted that any resistance encountered by the shift rod 42 in forcing the gear 25a into engagement with the gear 21, will be taken up by the spring 57 until registry is defined between the teeth of the two gears so that the impediment of the sliding of the gear 25a is removed. Likewise, if the gear 25a is to be removed from mesh with the gear 21, while there is considerable power being transmitted from one to the other, the frictional impediment to movement of the gear 25a is temporarily taken up by the spring 56, as compressed between the shoulder 52 and the front face of the cap 54.

The springs 72 and 73 provide for a yielding engagement and disengagement of the gears 23 and 29 which are moved by the shaft 43.

While the shift is being made from second to third gear, the offset hub is rotated to bring the lug 217 into contact with the lower and extended end of the lever 200. This contact, by means of the face 218 of the lug 217, lifts the end of the lever 200 to rotate the ratchet 205 by means of the pawl 204 in engagement therewith. After the lug 217 has passed the end of the lever 200 the spring 210 then replaces the lever in its original position and the end of the pawl 204 into a position directly to the front of the succeeding ratchet cog. A rotation of forty-five degrees is thus imparted to the ratchet 205 by the upward movement of the lever 200 to present the corner 213 of the block 217 to the spring contactor 223 rather than the face 216. Consequently, the spring 223 is forced downwardly and into contact with the member 226, leaving the member 227 electrically dead ended.

If the car is slowed down for any reason, as because of traffic conditions or a steep incline, the governor immediately acts to swing the arm 246 in an anti-clockwise direction to bring the electrode 261 again into contact with the commutator bar 270. Since it is often desired to operate the car in the higher gear at a vehicular speed attainable by the next lower gear, the gear shifting circuit before completed through contact of the electrode 261 and the commutator bar 270, has now been broken by the removal of the spring contactor 223 from the member 227 as above described. Hence there is no shifting of gears. Further slowing down of the car will bring the electrode into contact with the commutator bar 269, and to complete the circuit through the leg 230, thence through the member 226, the spring contactor 223, and through the coils 286 to close the contacts 288 and 296. Thus the eccentric 99 is again connected for operation by being engaged to the cog wheel 126 and for a rotation in a clockwise manner of three hundred sixty degrees. By this rotation of the eccentric 99 the connecting rod 148 again cuts off the fuel supply to the motor and releases the clutch, but the rocker arm 183 is swung in the opposite direction by the one hundred eighty degree revolution of the eccentrically mounted disc 181. The gear 25a is then disengaged from the gear 21 to release the transmission from direct connection to the propelling shaft 12, and the gear 25 is brought into connection with the gear 29, to arrange the gears of the transmission into position as second gear.

Upon the offset hub 104 is a lug similar to the lug 217 mounted upon the hub 100, and for coacting with the lever 199 and the ratchet and pawl mechanism in association therewith, in the exact manner as does the lever 200 with mechanism at the right side of the device. During the shifting of the gears from first to second gear, the block 196 was turned through an angle of forty-five degrees to present the flat side thereof to the spring contactor 222 rather than a corner, as illustrated in Figure 12. The spring contactor 222 then springs up on its own accord to break the contact with the contact 228 and to make contact with contact 229.

By reference to Figure 2, it will be observed that any contact of the electrode 261 with the commutator bar 268 and hence the circuit leg 232, which is dead ended in the contact 228, will be ineffective. However, as the car increases its negative acceleration, the governor will cause the electrode 261 to come in contact with the commutator bar 267, and to complete an electric circuit from the terminal 294 of the battery through the leg 266, the leg 233, the contact 229, the contactor spring 222, and through the leg 224, to energize the electromagnetic coils 287 for closing of the contacts 289 and 297. A circuit is then completed with the electric source for energizing the coil 128, and for engaging the eccentric 103 to the cog wheel 126 in the manner as previously described.

The eccentric is caused to turn through a complete revolution as above for the purpose of thrusting the connecting rod 149 forwardly to shut off the fuel supply to the motor and to disengage the clutch. Simultaneously with this movement of the eccentric 103, the gear 167 is caused to turn one hundred eighty degrees to swing the end of the arm 168 to a rearward position for rocking the arms 172 and 175 and the shaft 170 in an anticlockwise direction, and displace the gears 23 and 29 to a forward position as illustrated in Figure 3. The gear 31 having not been displaced during the progressive and retrogressive shifting of the second and third gear positions, remains in the position so that the low gear connection thereto is had by the gear 23 at the end of the forward movement, just described, of the shifting rod 43.

To completely stop the car, it is then necessary to depress the foot clutch lever and move the shifting rod 44 backwardly to move the gear 31 from mesh with the gear 23.

By mounting the governor so that the commutator block 262 is accessible to the operator as upon the dash of the car, the block may be readily shifted one way or the other relative the electrode 261 either to adjust the position of the commutating bars to change the speed limits of the automatic shifting, or to accomplish an emergency gear shift.

Shifting of the gear transmission into a position for driving the shaft 14 in a reverse direction is had by means of the hand lever 284 which operates the rod 44. It will be noted that between the gears 31 and 40, which are mutually operated by the fork 85, there is a space sufficient for the accommodation of the gear 23. It is when the gear 23 is intermediate the gears 31 and 40 that the gears are in the neutral arrangement.

A movement backwardly of the gear shift rod 44 and hence the gear 40, will bring the gear 40 into mesh with the gear 23 for driving the latter named gear. Since the gear 32 is in direct mesh continually with the gear 39, Figure 4, and for driving the splined shaft 37, that shaft is made to rotate in an opposite direction relative the gear 23 as is the countershaft 27. The connection of the gear 40 with the gear 23, therefore, will cause the shaft 16 to be driven in the opposite direction.

An examination of Figure 3 will disclose the fact that it would be disastrous, if for any reason the shifting of gears for the position of first, second or third speeds occurred simultaneously. It is the purpose of the safety lever 145 to the front of the cog wheel 126 to prevent the connection of the eccentrics 99 and 103 with the cog wheel at the same time. The operation of this lever is in combination with the triggers 117 and 134, and depends upon the camming surface provided by the bottoms of the grooves 101 and 105.

A side view of the groove 105 is shown in Figure 9. Here, it will be noted, as the hub 104 turns in an anti-clockwise direction, as viewed in that figure, the trigger 117 is held forward against the urge of the spring 119 by the eccentricity relative the shaft 97 of the bottom of the groove 105, until some point 305 is reached. The bottom of the groove deepens from the point 305 as the recess for the dog is approached. When the deepened portion of the groove arrives opposite the trigger, the trigger is allowed to move to the rear and present the wedge-like section 122 thereof in the path of the camming face 114 of the approaching dog.

While the trigger 117 is held in the forward position by the bottom of the groove 105 the left end of the safety lever 145 is displaced forwardly by the trigger to remove the opposite end of the said lever in the opposite direction. With the right end of the safety lever in a backward position it is held contiguous to the trigger 134 to prevent that trigger from being released from the dog by a retraction of the plunger 131 due to any energization of the coil 129. The bottom of the groove 101 is congruent to the bottom of the groove 105 so that when the trigger 134 is displaced forwardly, the left end of the lever 145 will be in a position to prevent a displacement of the trigger 117 should the coil 128 be energized.

Figure 14:
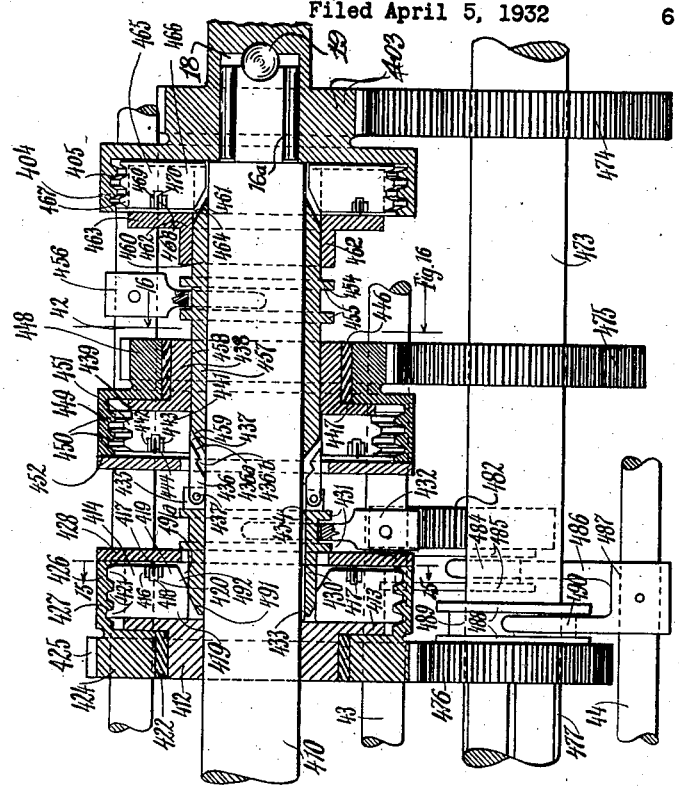
Figure 14 is a detailed view of a modified form of the invention with parts broken away to better illustrate construction.

In Figure 14 a different arrangement of gears as well as a new type of gear is shown whereby shifting of the gears from first to second and to third gear and back again through the reverse order may be accomplished without the act of engaging and disengaging of the respective gears.

Here the gear 403 is shown integral of the shaft 12 and in a direct alinement with the main shaft 410. The recess 18 in the back end of the propeller shaft 12 serves as a race for the ball bearings 16a about the section of the shaft 410 of smaller diameter. Intricate to the back wall of the gear 403 is a drum 404 having upon its internal periphery threads 405.

Figure 15:
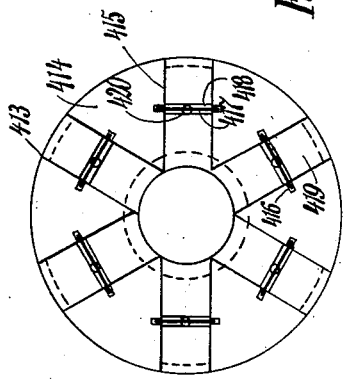
Figure 15 is an orthographic projection of a part of the mechanism shown in Figure 14 taken axially thereof at the line 15—15 of Figure 14.
Figure 16:
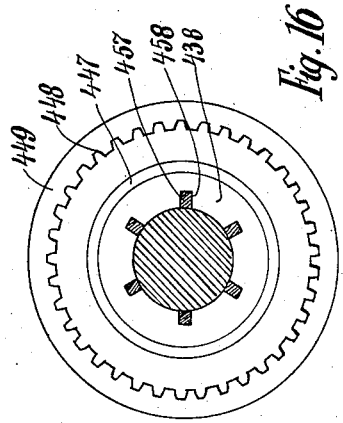
Figure 16 is a sectional view of the mechanism as taken on the line 16—16 of Figure 14.

Attention will now be directed to the back end of the main shaft 410 and particularly to a hub 412. Upon the forward edge of the hub is a flange 413, better illustrated in Figure 15. Protruding from the forward face of the flange 413 are sectors 414 providing guideways 415 therebetween. In the present instance there are six of the protuberances 414 and a like number of guideways.

In the opposed sides of the guideways and cut into the body of the raised portion 414 are notches 416. These notches are to accommodate the ends of small leaf springs 417 which are held in position within grooves 418 transgressing keys 419 by means of pins 420. Grooves 418 of the keys are of such a depth that the springs 417 rise only flush with the face of the raised portions 414 and of the exposed face of the keys 419. Movement within a race 415 may be had by a key 419 as limited by the flexibility of the spring 417. The outer end of each of the keys 419 has a short threaded section comprising ribs 421.

About the hub 412 is disposed a bronze bushing 422. Rotatively disposed upon the bushing 422 is a gear 424 having gear teeth 425. Depending forwardly from the periphery of the gear 424 and intricate therewith is a drum section 426. Circumscribing the interval surface of the drum 426 is a groove forming threads 427. It will be noted that the threads 427 are of the same pitch as the threads or ribs 421 upon the end of the slider member 419. Preferably the threads 421 and 427 are of the Acme type.

For holding the assembly of the keys 419 with the flange 413 and the drum 426 is an annular collar 428 held in position to the outer edge of the drum 426 by any standard means as bolts (not shown).

Ahead of the hub 412 upon the shaft 410 is a flanged sleeve 430. Flanges 431 upon this sleeve provide a way of connection for a fork 432, which is used for propelling the sleeve 430 longitudinally of the shaft 410. A rib 433 projecting from the shaft 410 into a recess 434 of the sleeve 430 precludes any turning of the sleeve about the shaft.

The forward edge of the sleeve 430 contains six notches 435 evenly spaced about the periphery of the shaft for the reception of the ends of small pintled members 436. The back and lower end of the members 436 is curved at a radius generated about a pin 437, the latter serving to connect the said members within the walls of the recesses 435. The forward end of the member 436 is undercut as it leads away from a rounded point 437 forming an inclined face 436a and a face 436b complemental thereto.

Substantially half way between the ends of the main shaft 410 is a hub 438 which is shrunk fast to the shaft. From the rear edge of the hub 438 extends a broad flange 439. This flange is identical with the flange 413 and bears raised segments (not shown) to provide guideways for key members 441. In the face of the keys 441, opposite to the flange 439, are cut grooves 442 into the bottoms of which are anchored posts 443. A spring 444 attached midway its ends to each post 443 extends its ends into notches (not shown) registering therewith and within the body of the segments forming the sides of the race.

A bronze bushing 446 upon the hub 438 has rotatively stationed thereon a gear 448. Integral to the gear 448 and extending rearwardly from the circumference of the back face thereof is an internally threaded section or drum 449. A groove effecting threads 450 circumscribes the internal periphery of the drum 449, the threads being of the same pitch as the threads or ribs 451 configured upon the extended end of the key members 441, and to coact therewith in a manner later to be described. A flat ring 452 is secured to the back extended edge of the drum 449 by means of bolts (not shown) to serve as a stop and prevent movement of the keys 441 backwardly and axially of the shaft 410.

Forwardly of the hub 438 and upon the shaft 410 is a sleeve 454 bearing flanges 455, the latter forming a race therebetween in which the prongs of a fork 456 may extend. Extending rearwardly from the reciprocable member 454 are a number of bosses 457. These bosses extend through apertures 458 transgressing the body of the hub 438 and into a position beneath each of the keys 441 disposed at the opposite side of the gear 448.

An inclined surface 459 is effected to the extended end of the bosses 457. The locking members 436 and the bosses 457 are in direct alinement and disposed beneath each of the key members 441. Extending from the forward end of the slider member 454 are bosses 460 provided with an inclined surface 461 to their respective ends.

Attached to the forward end of the shaft 410 in a non-rotative manner is a flanged hub 462, the flange thereof being designated by the numeral 463. Transgressing the hub 462 longitudinally are apertures 464 which accommodate the bosses 460. Said bosses may be moved therein longitudinally of the shaft 410. Raised blocks 465, similar to the raised portions 414 of the flange 413, and integral to the flange 463, provide therebetween a number of radially arranged races similar to those previously described upon either of the flanges 413 or 439.

Reciprocally disposed within the races between the blocks 465 integral of the flange 463 are keys 466 having ribs or threads 467 at their outer ends. A short leaf spring 468 within a recess 469 of the front face of each key 466 is held by a small post 470 and projects its ends into recesses at either side of the races provided to constantly urge the keys into a position retracted from the threads 405 of the drum section 404 of the gear 403. A groove is cut about the inner exposed surface of the drum 404 to form the threads 405.

Suitable bearings within the gear housing support in a rotative manner the countershaft 473. Adjacent the front wall of the housing (not shown in Figure 14, but similar to the front wall 11 of housing 10, Figure 3) and fixedly keyed to the shaft 473 in a manner to engage the gear 403 is a gear 474.

Gears 403 and 474 are constantly engaged so that at all times the shaft 12 is rotating the countershaft 473 is caused to rotate.

Gear 475 is keyed to the shaft 473 in a position to mesh with the gear 448. Gears 448 and 475 are the combination through which the intermediate speed to the car is had. These two gears also remain constantly in mesh.

The section of the shaft 473 upon which the low gear 476 is mounted has splines 477 extending axially thereof. Splines 477 engage key ways in the hub of the gear 476 to prevent the rotation of that gear about the shaft 473 but to permit of a movement of said gear axially of said shaft.

A splined shaft (not shown) parallel to the shaft 473 is driven from the latter named shaft in the same manner as is the shaft 37 driven from the shaft 27, Figure 4. Upon this splined shaft is carried a gear 482 free to move axially thereof as guided by splines.

Either integral or fabricated to the back face of the gear 482 is a flanged sleeve 484. Flanges 485 upon the sleeve 484 co-engage the bifurcated member 486 of a compound fork 487. Likewise, the flanges 488 of a sleeve 489 depending from the forward face of the low gear 476 engage the elements 490 extending from the fork 487.

It will be noted at this time that the device in its modified form as just described may be operated by the shifting mechanism disposed above the gear housing shown in Figures 1, 2 and 3. The fork 456 is connected to the shifter rod 42; the fork 432 is connected to the shifter rod 43; while the fork 487 is connected to the shifter rod 44.

The car is set in motion in exactly the same manner as was previously described in connection with the first form of the invention. With the motor running, a foot pedal is depressed for maintaining the clutch 13 in a disengaged position while the rod 44 is shifted forwardly by the hand lever 284 to engage the gear 476 with the gear 424. The fork members 490 cooperate with the flanged sleeve 489 to pull the gear 476 into the engaged position. Subsequent to the engaging of the gears 476 and 424, the clutch pedal is released thus causing the shafts 12 and 473 to rotate. The gear 476 then imparts a rotary motion to the gear 424 and the drum 426.

In order for the gear 424 to turn the shaft 410 the levers 172 and 175 must at this time have been so rocked that the operating rod 43 is to the rear so that the flanged sleeve 430 which is connected to the operating rod 43 by means of the shifter fork 432 will be to the rear. When in the back position the shoulder 491 of the sleeve is brought against the inclined surface 492 at the lower and forward corner of the keys 419 to displace the keys outwardly and radially against the urge of the springs 417 to place the threads 421 in a position interlocking with the threads 427 of the drum 426. A rotating movement of the gear 424 and drum 426 with the threads so engaged causes the slider members 419 to progress axially of the shaft 410 until further movement of said members is prevented by the colliding thereof with the stop 413. At this time a locking occurs between threaded elements to cause the keys 419 to rotate with the flange and hence abut against the raised sections 414 to cause the hub 412 and the shaft 410 to rotate in a like direction.

With the running gear of the car now in driving connection with the motor it is accelerated to operate the governor by the latter's connection to the main shaft. The governor at a predetermined speed of the drive shaft 14, since that shaft rotates in direct connection with the main shaft 410, connects the electrode 261 to the commutator bar 268 causing the eccentric 103 and gear 102 to be operatively connected to the shaft 97 for shifting the rod 43. In the present instance the shifter rod 43 must move forwardly to disengage the low gear connection while in the former case it had to be moved backwardly. To obtain a forward movement of the rod in the same sequence as the former backward movement it is only necessary to reaffix the arm 168 upon the shaft 166 by rotating the arm relative the shaft one hundred eighty degrees from the position shown in Figure 2. A subsequent turning of the gear 167 through one hundred eighty degrees will then effect the arms 172 and 175 to rock in an anti-clockwise direction, as viewed from the right side of the device, to force the shaft 43 forwardly.

Concurrent to the forward movement of the shifter rod 43 the fuel supply to the motor is cut off and the clutch is released as before described. The fork 432 which is connected between the sleeve 430 and the shifter rod 43 propels the sleeve forwardly withdrawing the shoulder 491a from under the keys 419. The springs 417 having been deformed during the displacement of the keys 419 to engage the threads 421 with those of the drum 426 now urge the keys out of the engagement with the drum, so that there may be free movement between the gear 424 and the hub 412, or the shaft 410.

A further movement forwardly of the sleeve 430 brings the faces 436a into sliding contact with the camming surfaces 459 to deflect the points 437 of the locking pieces 436 against the inner ends of the keys 441 to displace the keys outwardly thus bringing the threads 451 into engagement with those upon the internal periphery of the drum 449. This displaced position of the keys is maintained by the resting of the undercut shoulder 436b of the locking pieces upon the top face of the bosses 457.

It will be recalled that the hub 438 bearing the flange 439 is fixed to the shaft 410 to rotate therewith and hence the keys 441 held within the guideways between the sector shaped bosses projecting therefrom, and similar to the raised sections 414 of the flange or stop 413, are caused to move at a speed different than that of the drum 449 which is being driven by the gears 448 and 475.

When the main shaft 410 is being driven in the first speed the drum 449 is turning more rapidly than the keys 441, but in the same direction. After the release of the clutch however, in accordance to shifting the gear connections from first to second speed, the countershaft slows down since it is then being driven only by its momentum, and the speed of the drum 449 approaches that of the keys 441 incident to the engagement of the threads 450 and 451. A more constant speed of the main shaft 410 is maintained because of its direct connection to the running gear of the car.

It will be conceived that with the tendency of the countershaft 473 and the associated gears to slow down that should any tendency of sticking occur between the threads 421 and 427 such sticking would be released by the resulting effect of the threads to drive the keys 419 away from the flange 413 and toward the annular collar 428. Once loosened and with the shoulder 491a removed from the inner ends thereof the keys 419 will be drawn inwardly by the springs 417 to free the gear 424 from connection with the main shaft.

As soon as the keys 441 are displaced outwardly by the locking member 436 the clutch has been re-engaged, motive power is applied to the drum 449 causing it to turn at a greater speed than the keys 441, and, by the threaded connection to the keys, to move them longitudinally of the shaft 410 until stopped by the annular collar 452. Movement between the drum and keys is then prohibited and the shaft 410 is made to rotate at the speed of the gear 448. This speed of the shaft 410 corresponds to second speed.

When the car has attained a speed sufficient for the gears to be connected into the third speed connection the electrode 261 has been carried into contact with the commutator bar 270 to cause a thrust of the shifting rod 42 to its forward position. The sleeve 454 is moved in concert with the shifter rod 42 by means of the fork 456 to withdraw the bosses from beneath the locking pieces 436 thus permitting the keys 441 to be retracted inwardly and the hub 438 to be released from the connection with the drum 449 and the gear 448.

Further movement of the sleeve 454 after releasing the keys 441 brings the bosses 460 beneath the keys 466 to establish an interlocking connection between the threads 405 and 467. The gear wheel 403 at the time of connection of the threaded members is turning slightly faster than the keys 466 hence the coacting sets of threads causes the keys to advance against the flange 463 thereby precluding further turning movement between the drum 404 and the keys and causing a locked connection between the shafts 12 and 110. The drive shaft 14 is then in direct connection with the propeller shaft and the car is in third, or high gear.

While in the high gear connection the breaking action of the motor is not lost by a loosening of the keys 466 from the flange 463 for when the shaft 410 is tending to rotate at a greater speed than the shaft 12 the bosses 460 retain the keys 466 in their outward position while they are moved forwardly by the threads to a position against the back face of the radial wall of the drum 404 to lock the two shafts 12 and 410 against turning relative to one another in the opposite direction. The same condition exists in regard to the first and second speed gear connections.

In first gear, while the shoulder 491a is under the keys 419, said keys will be moved, by their threaded connection with the drum 426, either against the flange 413 or the annular collar 428 to prevent a rotation relative to the gear 424 and the hub 412 therefor, depending upon whether the hub is driving the gear or the gear the hub.

Keys 441 are traversable along the support of the rounded point 437 on the locking member 436 to engage either the collar 452 or the flange 439 to result in the hub 438 driving the gear 448 or the reverse.

When the car is slowed down to a certain desired speed, the governor makes the before described electrical connection to effect a backward movement of the shifter rod 42 and for withdrawing the wedge-like fingers 460 from under the keys 466 so that those keys may be removed by the effort of the spring 468 from engagement with the drum 404. The clutch having been released and the fuel supply of the motor having been cut off the bosses 457 upon further backward movement, due to the retracting of the rod 42, slide under the inclined faces of the locking members 436 to slide the keys 441 outwardly and connect the hub 438 and hence the shaft 410 with the gear 448. At this time the gears are again arranged for second speed.

At a still lower speed of the car the governor trips the mechanism for moving the shifter rod 43 to the rear to move the sleeve 430 therewith and extract the locking members 436 from under the keys 441 allowing the latter to move inwardly of the shaft 410 under the influence of the springs 444. The second gear 448 is in this manner released from the shaft 410 before the shoulder 491a of the sleeve 430 is carried beneath the keys 419 for engaging the keys 419 to the drum 426 to connect the low gear 424 to the main shaft.

The gear 476 may at this time be disengaged from the gear 424 by releasing the clutch by a conventional foot pedal and shifting the hand lever to the neutral position to thereby move the shifter rod 44 and said gear to the rear. At the completion of the shift the gears will be in the neutral position and no power will be transmitted from the shaft 12 to the shaft 410.

If so desired the low gear 476 may be shifted out of engagement with the gear 424 complemental thereto while the car is driven in either the second or third speed and without first disengaging the clutch. Also when this is done the automatic shifting mechanism will bring the car from a speed of high gear to a neutral position without the subsequent depressing of the clutch pedal and movement of the gear shift lever.

Movement of the shifter rod 44 to its rearmost position brings the gear 482 into mesh with the gear 424 to rotate the last named gear and hence the main shaft 410 and the drive shaft 14 in the reverse direction.

It will be noted that when the gears are arranged for either reverse or low gear that the shifter rod 43 is in its back position to hold the shoulder 491a beneath the keys 419 to hold the gear 424 in non-rotative connection with the shaft 410. Then when the shifter rod 44 is in the forward position the low gear 476 drives the shaft 14, and when the rod 44 is shifted to its backward position the reverse gear 482 drives the shaft 14, and when the gear 424 is between the gears 476 and 482 there is no transmission of power and the gears are in neutral.

Since there is not such a rapid progression of screw threads axially of the internally threaded drums as there is a rotary tangential movement thereof, the threads within the drums and those upon the keys may be engaged when there is a greater difference in the speed of the main shaft and the countershaft than may the teeth of gears respectively upon the mainshaft and countershaft which are moving at the tangential speed be engaged. Therefore all danger of clashing of the threaded elements in the present mechanism is obviated and under ordinary operating conditions there would be no necessity for releasing the clutch while manipulating the gears to loosen them from, or to make them fast to, the shaft by means of those threaded elements.

What is claimed as new and is desired to be secured by Letters Patent of the United States is:

1. The combination with a gear transmission having shafts, and gears adapted to slide axially of said shafts for coengagement to propel a drive shaft at a selected speed relative to said gears, of a mechanism for automatically engaging said gears and comprising a governor, a rotating member, means for sliding said gears, and means for operatively engaging said rotating means to said gear sliding means incident to selected speeds, attained in a definite order, of said drive shaft, said governor being adapted to actuate said engaging means.

2. The combination with a gear transmission having shafts, and gears adapted to slide axially of said shafts for coengagement, of a mechanism for automatically engaging said gears and comprising a governor, a rotating member, means for sliding said gears, means for normally urging an operative connection between said rotating member and said gear sliding means, and means for restraining said urging means, the said governor being adapted to release said restraining means.

3. The combination with a gear transmission having shafts, a drive shaft driven by other of said shafts and gears adapted to slide axially of said shafts for coengagement, of a mechanism for automatically engaging said gears and comprising a governor actuated by said drive shaft, a rotating member, means for sliding said gears, means for normally urging an operative connection between said rotating member and said gear sliding means, and means for restraining said urging means, the governor being adapted to release said restraining means.

4. The combination with a gear transmission having shafts driven by a prime mover, and gears adapted to slide axially of said shafts for coengagement and for the propelling of a drive shaft, of a mechanism for automatically engaging said gears and comprising a governor actuated by said drive shaft, a rotating member driven by said prime mover, means for sliding said gears, means for normally urging an operative connection between said sliding means and said rotating member, and means for restraining said urging means, said governor being operable with said restraining means in a manner obtaining the release of the latter.

5. The combination with a gear transmission having shafts driven by a prime mover, and gears adapted to slide axially of said shafts for coengagement and for the propelling of a drive shaft, of a mechanism for automatically coengaging said gears and comprising a governor actuated by said drive shaft, a rotating member driven by said prime mover, means for sliding said gears, means for normally urging an operative connection between said sliding means and said rotating member, means for restraining said urging means, and electromagnetic instrumentalities adapted to release said restraining means under the control of said governor.

6. The combination with a gear transmission having shafts driven by a prime mover for the propelling of a drive shaft, and gears adapted to slide axially of said shafts for co-engagement, of a mechanism for automatically coengaging said gears in a desired manner incident to a predetermined speed of said drive shaft comprising a governor actuated by said drive shaft, a rotating member driven by said prime mover, means for sliding said gears, means for normally urging an operative connection between said sliding means and said rotating member, and means for restraining said urging means, said governor being adapted to release said restraining means.

7. The combination with a gear transmission having shafts driven by a prime mover and for the propelling of a drive shaft, and gears adapted to slide axially of said shafts for coengagement, of a mechanism for automatically coengaging said gears in a desired manner incident to a predetermined speed of said drive shaft, comprising a governor actuated by said drive shaft, a rotating member driven by said prime mover, means for sliding said gears, means for normally urging an operative connection between said sliding means and said rotating member, means for restraining said urging means, and electromagnetic instrumentalities under the control of said governor to release said restraining means.

8. The combination with a gear transmission having shafts, and gears adapted to slide axially of said shafts for coengagement, of a mechanism for automatically coengaging said gears in a predetermined manner and comprising a governor, a rotating member providing cogs, means for sliding said gears, a member being urged into an operative connection between said cogs and said sliding means, a trigger restraining said urged member, and means in control of said governor for the release of said trigger.

9. The combination with a gear transmission having shafts driven by a prime mover to propel a drive shaft, and gears adapted to slide axially of said shafting for coengagement, of a mechanism for automatically coengaging said gears in a predetermined manner, comprising a governor, a rotating member, means for sliding said gears including a gear wheel, a member normally urged into an operative connection between said rotating member and said gear for mutual rotation thereof, a trigger restraining said urged member, and means in control of said governor for the release of said trigger.

10. The combination with a gear transmission having shafting driven by a prime mover to propel a drive shaft, and gears adapted to slide axially of said shafting for coengagement, of a mechanism for automatically coengaging said gears in a predetermined manner comprising a governor, a rotating member, means for sliding said gears including a gear wheel, a member normally urged into an operative connection between said rotating member and said gear wheel for mutual rotation thereof, a trigger restraining said urged member, and electromagnetic instrumentalities in the control of said governor for the release of said trigger.

11. The combination with a gear transmission having shafting driven by a prime mover to propel a drive shaft and gears adapted to slide axially of said shaft for coengagement, of a mechanism for coengaging said gears in a predetermined manner comprising a governor including complementary movable electrodes, a rotating member, means for sliding said gears including a gear wheel, a member normally urged to connect said rotating member and said gear wheel for mutual rotation, a trigger for restraining said urged member, and electromagnetic instrumentalities affiliated with said electrodes and said trigger, said governor being adapted to contact said electrodes for energizing said instrumentalities for releasing said trigger.

12. The combination with a gear transmission having shafting and gear slidable axially of said shafting for coengagement into a plurality of arrangements, of a mechanism for automatically and chronologically manipulating said gears into and out of said arrangement comprising a governor including complemental movable electrodes, a rotating member, independent means for sliding said gears into each of said arrangements, a member normally urged into operative connection of each of said sliding means and said rotating means, means for restraining each of said urged members, and electromagnetic instrumentalities for independently releasing said restraining means and adapted to be actuated by the contacting of said electrodes, said governor being disposed to make contact between said electrodes in a certain desired order.

13. The combination with a gear transmission connecting a driving element and a driven element and having shafting and gears slidable axially of said shafting for coengagement into a plurality of arrangements for propelling said driven element at different speeds relative said driving element, of a mechanism for automatically and successively manipulating said gears into and out of said arrangements comprising a governor actuated by said driven element and including complemental movable electrodes, a rotating member, independent means for sliding said gears into each of said arrangements, a member normally urged into independent operative connection of each of said sliding means and said rotating member, means for restraining each of said urged members, means for independently releasing said restraining means and adapted to be actuated in accordance to the contacting of said electrodes, said governor being disposed to cause contact between said electrodes in a selected order.

14. The combination with a gear transmission connecting a driving element and a driven element having shafting and gears slidably axially of said shafting into coengagement, of a mechanism for automatically manipulating said gears into and out of said coengagement comprising a governor actuated by said driven element, complemental electrodes associated with said governor, a rotating member, means for sliding said gears, a member normally urged into operative connection of said rotating member said sliding means, means for restraining said urged member, means in connection with said electrodes for releasing said restraining means upon contact of said electrodes, and means for disengaging said urged means from the operative connection, said governor being adapted for contacting said electrodes, and said disengaging means being adapted to act incident a selected manipulation of said gears.

15. The combination with a gear transmission connecting a driving element and a driven element having shafting, and gears slidable axially of said shafting for coengagement into a plurality of arrangements for propelling said driven element at different speeds relative said driving element, of a mechanism for automatically manipulating said gears into and out of said arrangements, comprising a governor actuated by said driven element and including complemental movable electrodes, a rotating member, independent means for sliding said gears into each of said arrangements, a member for each of said sliding means normally urged into operative connection of said sliding means and said rotating member, means for restraining said urged members, means in connection with certain of said electrodes for releasing certain of said restraining means, and means for the disengaging of said urged members from the said operative connection, said governor being adapted to contact said electrodes for actuating said releasing means, said disengaging means being adapted for operation incident the completion of any of said gear arrangements.

16. The combination with a gear transmission connecting a driving element and a driven element and having shafting, and gears slidable axially of said shafting, of a mechanism for automatically manipulating said gears into and out of engagement comprising a governor actuated by said driven element, complemental electrodes associated with said governor, a rotating member, means for sliding said gears, a member normally urged into operative connection with said rotating member and said sliding means, means for restraining said urged member, means in connection with said electrodes for releasing said restraining means upon contact of said electrodes, certain of said electrodes being adapted to release said urged member for the manipulation of said gears to drive the driven element at a certain speed relative said driving element in accordance with selected speed of said driven element, certain other of said electrodes being adapted for the manipulation of said gears to drive the driven element at a certain and different speed relative to said driving element in accordance with a different selected speed of said driven element.

17. In combination, an engine having a shaft, a driven shaft, gears intermediate said engine shaft and said driven shaft, means driven by said engine for shifting said gears to provide different ratios of rotation between said shafts, means movable with said driven shaft for actuating said shifting means incident to different speeds of said driven shaft, and means automatically changing the incident of actuation of said shifting actuating means with respect to the speed of said driven shaft.

18. In combination, an engine having a shaft, a driven shaft, gears intermediate said engine shaft and said driven shaft, means driven by said engine for shifting said gears to provide different ratios of rotation between said shafts, and means for determining when said gears shall be shifted, comprising a part controlled by said driven shaft, and a part having a control means independent of said driven shaft.

19. In combination, an engine having a shaft, a driven shaft, gears intermediate said engine shaft and said driven shaft and arranged to provide different ratios of speed therebetween, means driven by said engine for changing the arrangements between said gears, and means for determining the incident, depending upon the speed of rotation of said driven shaft, when said gear arranging means shall operate and comprising complemental parts, one of said parts being actuated by said driven shaft, another of said parts being actuated in pursuance to a rearrangement of said gears.

20. In combination, an engine having a shaft, a driven shaft, gears intermediate said engine shaft and said driven shaft and adapted to be arranged to provide different ratios of speed therebetween, means utilizing the power of said engine for shifting said gears, and means for determining the cycle of operation of said gears and comprising complemental parts, one of said parts depending upon the speed of said driven shaft for its actuation, another of said parts being dependent upon the arrangement of said gears.

FRED GINSBURG.